T. A. EDISON.
SPROCKET CHAIN DRIVE.
APPLICATION FILED JUNE 26, 1907.
954,789.
Patented Apr. 12, 1910.
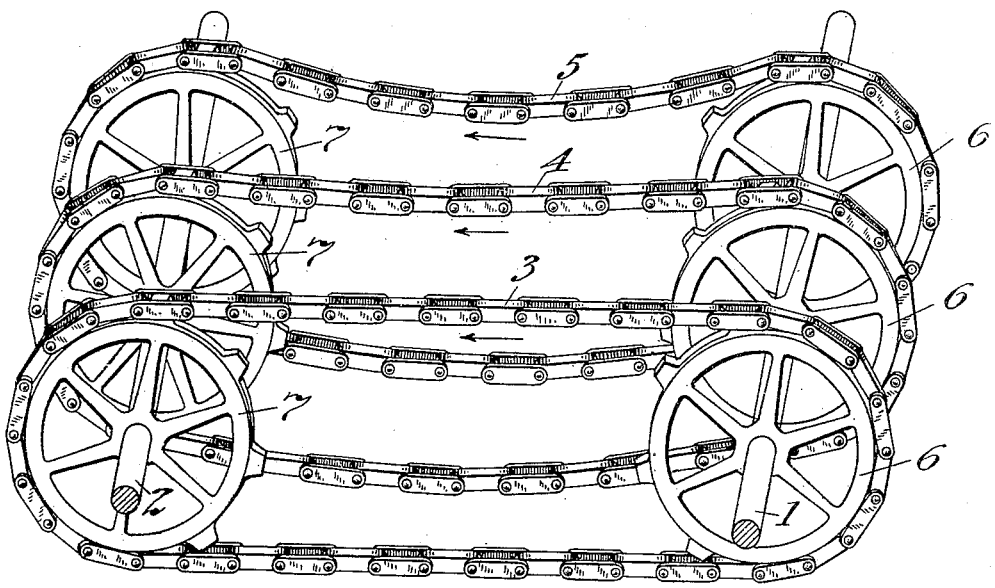

UNITED STATES PATENT OFFICE.

THOMAS A. EDISON, OF LLEWELLYN PARK, ORANGE, NEW JERSEY.

SPROCKET-CHAIN DRIVE.

954,789.     Specification of Letters Patent.     Patented Apr. 12, 1910.

Application filed June 26, 1907. Serial No. 380,948.

*To all whom it may concern:*

Be it known that I, THOMAS A. EDISON, a citizen of the United States, and a resident of Llewellyn Park, Orange, in the county of Essex and State of New Jersey, have invented certain new and useful Improvements in Sprocket-Chain Drives, of which the following is a description.

It frequently happens in manufacturing establishments, and in other places where machinery is used, that situations are presented requiring the use of sprocket-chains. These chains are not long lived and it is difficult to inspect them to determine their exact condition. Consequently, it is usually the practice to operate the chains until they break, when they are replaced by a new chain, but this operation is more or less tedious and necessitates the stoppage of at least the driven part of the machinery. I have encountered these difficulties in connection with the operation of a large cement mill where sprocket-chains are necessary for connecting belt conveyers together, and when one of these chains breaks a very considerable accumulation of raw material takes place between the conveyers before the driving machinery can be stopped.

My invention provides an improved sprocket-drive which can be used in any locality where sprocket-chains are important, and it possesses the commercial advantage that a breakage of the driving-chain will not in any way interfere with the continued operation of the apparatus.

To this end the invention comprises a driving and a driven shaft connected by a plurality of sprocket-chains, so that if one of the chains becomes broken, the parts will still continue to operate by reason of the remaining chain or chains. In case of the breakage of a sprocket-chain, it is merely driven off by the sprocket-wheels and falls below the shafts, and its absence being noted, it can be replaced by a new chain at any convenient time when the machinery is shut down. Preferably, the chains will be so adjusted that all the work will be performed by one of the chains, so that the other chain or chains will be simply moved idly by the sprocket-wheels, without performing work and hence without objectionable wear. Consequently, when the driving-chain breaks, the work will be taken up automatically by the chain having the least slack, which in its turn will become the driving-chain until broken in use.

In order that the invention may be better understood, attention is directed to the accompanying drawing showing a perspective view of a driving and driven shaft with three sprocket-chains.

1 and 2 are the two shafts, one of which is a driving shaft and the other a driven shaft, and 3, 4 and 5 are three sprocket-chains engaging sprocket-wheels 6—6—6 and 7—7—7 on the shafts 1 and 2 respectively. Two sprocket-chains may be used, but I prefer to employ three of them for greater safety. Preferably, the chains are so arranged as shown, that one of the chains, for instance 3, will transmit the power, the next chain 4 having a slight slack, and the remaining chain 5, a greater slack. Consequently, the chains 4 and 5 will be merely moved idly without transmitting power, and there will be little or no wear on them. When the chain 3 breaks it will simply be rolled off the sprocket-wheels and fall below the shafts, and the chain 4 will then automatically come into play to transmit the power. Similarly, when the chain 4 breaks, the chain 5 becomes the active chain. When a chain is broken, its absence will be noted and it will be replaced at any convenient time, by a new chain which will be given the required slack.

Having now described my invention, what I claim as new and desire to secure by Letters Patent, is as follows:

1. In a sprocket chain drive, the combination with driving and driven shafts, of a plurality of sprocket wheels thereon, a plurality of sprocket chains connecting the corresponding sprocket wheels of the two shafts, one sprocket chain being adjusted for primarily transmitting the power, and the other sprocket chain or chains being adjusted to run idly in reserve to transmit the power, each on the failure of the preceding chain, as the second chain on the failure of the first, substantially as set forth.

2. In the sprocket-chain drive the combination with two shafts of two sprocket-wheels fast on each shaft and sprocket-chains connecting the corresponding sprocket wheels of the two shafts, one chain transmitting the power from one shaft to the other, and the other chain being so adjusted as to move idly with slack therein, substantially as set forth.

3. In a sprocket-chain drive, the combination with a pair of shafts and a plurality of sprocket-wheels on each of said shafts, of sprocket-chains connecting the corresponding sprocket-wheels of the two shafts, one of said chains transmitting power from one shaft to the other and the other chains being provided with successively increasing slack, substantially as set forth.

This specification signed and witnessed this 11th day of June 1907.

THOS. A. EDISON.

Witnesses:
  FRANK L. DYER,
  ANNA R. KLEHM.